United States Patent
Gottfriedsen

(10) Patent No.: US 12,111,202 B2
(45) Date of Patent: Oct. 8, 2024

(54) METHOD FOR OPTIMIZING A WEIGHING CONVEYOR

(71) Applicant: Wipotec GmbH, Kaiserslautern (DE)

(72) Inventor: Jan Gottfriedsen, Waldfischbach-Burgalben (DE)

(73) Assignee: Wipotec GmbH, Kaiserslautern (DE)

( * ) Notice: Subject to any disclaimer, the term of this patent is extended or adjusted under 35 U.S.C. 154(b) by 942 days.

(21) Appl. No.: 17/052,771

(22) PCT Filed: Apr. 30, 2019

(86) PCT No.: PCT/DE2019/100389
§ 371 (c)(1),
(2) Date: Jun. 28, 2021

(87) PCT Pub. No.: WO2019/210910
PCT Pub. Date: Nov. 7, 2019

(65) Prior Publication Data
US 2021/0325234 A1    Oct. 21, 2021

(30) Foreign Application Priority Data

May 4, 2018  (DE) .......................... 102018110797.8

(51) Int. Cl.
*G01G 11/00*   (2006.01)
*B65G 43/08*   (2006.01)
(Continued)

(52) U.S. Cl.
CPC ........... *G01G 11/006* (2013.01); *B65G 43/08* (2013.01); *B65G 47/02* (2013.01); *B65G 47/42* (2013.01);
(Continued)

(58) Field of Classification Search
CPC ........ G01G 11/06; G01G 23/01; G01G 23/06; B65G 43/08; B65G 47/02; B65G 47/42; B65G 2203/0258; G01M 1/30
(Continued)

(56) References Cited

U.S. PATENT DOCUMENTS 5,639,995 A  *  6/1997  Mosher ................ G01G 13/026
                                                                    177/1
5,813,195 A  *  9/1998  Nielsen ..................... B65B 1/32
                                                                   177/25.18
(Continued)

FOREIGN PATENT DOCUMENTS

AU    2011101449    *  8/2011    ............. B65G 39/16
DE    3933710 A1       4/1990
(Continued)

OTHER PUBLICATIONS

DE102018110797.8 German Office action dated Feb. 12, 2019.
PCT/DE2019/100389 International Preliminary Report on Patentability, issued on Nov. 10, 2020.

*Primary Examiner* — Jacques M Saint Surin
(74) *Attorney, Agent, or Firm* — Calvert Technology Law, PLLC; Nathan H. Calvert

(57) ABSTRACT

A method for optimizing the running properties of a rotating belt of a weighing belt conveyor includes, for at least one rotation of the belt, determining a unique reference position on the belt. A force signal is determined in dependence on the movement of the belt with respect to the reference position during the at least one rotation. From this force signal, the course of a deviation of the force signal from a set value as a consequence of a disruptive force is determined. At least in correspondence with the direction of the determined deviation, the mass of the belt is increased or
(Continued)

reduced at locations in dependence on the position of the belt with respect to the reference position.

16 Claims, 5 Drawing Sheets

(51) Int. Cl.
    *B65G 47/02*     (2006.01)
    *B65G 47/42*     (2006.01)
    *G01G 23/01*     (2006.01)
    *G01G 23/06*     (2006.01)
    *G01M 1/30*     (2006.01)

(52) U.S. Cl.
    CPC ............. *G01G 23/01* (2013.01); *G01G 23/06* (2013.01); *G01M 1/30* (2013.01); *B65G 2203/0258* (2013.01)

(58) Field of Classification Search
    USPC .......................................................... 177/16
    See application file for complete search history.

(56) References Cited

U.S. PATENT DOCUMENTS

| | | | | |
|---|---|---|---|---|
| 5,841,541 | A * | 11/1998 | Dlugos | G01B 11/02 177/1 |
| 6,283,853 | B1 * | 9/2001 | Pellenc | G01G 3/1414 460/6 |
| 6,907,409 | B1 * | 6/2005 | Huebler | G01G 19/005 235/383 |
| 8,168,897 | B2 * | 5/2012 | Sudkamp | B65G 47/5104 198/444 |
| 9,074,923 | B2 * | 7/2015 | Hyer | G01G 11/00 |
| 2006/0278499 | A1 | 12/2006 | Grywacheski et al. | |

FOREIGN PATENT DOCUMENTS

| | | |
|---|---|---|
| DE | 40 11 724 A1 | 10/1991 |
| DE | 44 46 163 A1 | 7/1996 |
| DE | 10 2007 027394 A1 | 12/2008 |
| DE | 102010053275 A1 | 6/2012 |

* cited by examiner

METHOD FOR OPTIMIZING A WEIGHING CONVEYOR

TECHNICAL FIELD OF THE INVENTION

The invention concerns methods for optimizing a belt or a band of a belt conveyor, in particular a weighing belt conveyor. The invention also encompasses conveyor belts optimized according to the methods and to devices for conducting such methods.

BACKGROUND OF THE INVENTION

Conveyor belts are usually made of one or more individual sections, the ends of which are joined to each other into a closed endless belt. For the most part, the main job of conveyor belts is only to transport bulk material or individual products, for which the endless belt and in particular the connecting points of the individual belt sections must have the necessary strength.

When using conveyor belts in weighing technology, for instance in high precision, dynamic, automatic weighing systems or scales, in which the conveyor belts, as a part of transport devices, form the preload for a weighing cell (weighing belt conveyors), the conveyor belt must, however, additionally have a mass distribution that is as homogeneous as possible. As the conveyor belt circulates, inhomogeneous mass distributions lead to undesirable disruptive forces (belt impact or imbalance), which are introduced into the weighing cell and distort the measurement result. Especially with high speed conveyor belts, the belt impact is too high to be able to weigh with sufficient precision.

Such disruptive forces arise (in a flat, in particular horizontal, belt layout) in particular when a region with an inhomogeneously distributed mass changes direction on the pulleys of the conveyor belt that is used as a weighing belt. A high likelihood of inhomogeneous mass distributions exists mostly along the connecting points or splices, i.e., in the region of the belt sections that are connected together by various techniques to make the conveyor belt.

Correspondingly, there are already known methods, for example from DE 3933710 A1 and DE 202006008946 U1, which deal with improving the connecting points of endless belts.

Furthermore, steps for taking into account or subtracting such an imbalance (belt impact) in processing the measured value using a filter are known. However, the use of filters delays the signal evaluation and requires time, which is for the most part not sufficiently available for such a purpose in high speed weighing operations. In particular, an averaging of the disruptive parameters over the entire belt length is not possible if a plurality of goods is being weighed per rotation. A filter could be synchronized with the rotation rate of the belt, but speed changes of the belt could lead to distortions of this filter function.

Of course, there could be other inhomogeneities of the belt, or uneven mass distribution in the manufacture of the belt, for example application of a cover layer on a fabric, etc., that lead to disruptive forces and disadvantageously distort a weight signal.

SUMMARY OF THE INVENTION

It is an object of the invention provide methods and devices that allow an optimization of the running properties of a conveyor belt of a weighing belt conveyor.

In particular, a correction (reduction) or even an elimination of (existing) disruptive parameters, in particular imbalance, of a conveyor belt (also called "belting" or simply a "belt" in what follows) of a weighing belt conveyor that could distort a weight signal is enabled by methods and devices according to the present invention.

The belt of a weighing belt conveyor is an endless belt, which is guided over a plurality of pulleys (two, three, or more). If a belt is not made ideally homogeneous in its mass over its entire length, such inhomogeneities of mass can give rise to disruptive forces which distort a weight signal (fractions of centripetal or centrifugal force in parallel to the sensor), especially in a change of direction from a linear motion, primarily at constant speed.

According to the invention, consideration of the mass over the length of the belt circumference is preferably sufficient. Consideration of the mass of the belt in the width direction may not be necessary, since the mass inhomogeneity over the width of the belt (perpendicular to the transport direction) leads only to a torque at the reversal of direction and does not adversely affect the determined force signal.

According to one aspect of the invention, a deviation from a preset or determined (for example average value) set value of a force signal is determined and preferably recorded (for example stored in a memory), for example by means of a force or acceleration sensor, which detects the force or acceleration in a predefined direction, preferably vertically, over at least one rotation of the belt. Correspondingly, this deviation is dependent on the position of the belt or the path that the belt travels.

In order to produce a relationship between the belt position and the signal, preferably the force signal, a unique reference position is defined in the direction of rotation of the belt. For this a marking, which is detected with a detector, preferably a reflex light barrier, can be applied to the belt, preferably only temporarily (for optimization of the belt). Of course, it is also possible within the scope of the present invention to determine a reference position by a different definition, for example through a unique position of a pulley about the rotational axis thereof.

According to aspects of the invention, at least the direction of the deviation of the signal is known, so that belt material is added or material is removed at the corresponding point of the belt. If the amounts of the changes or of the masses in relationship to the total mass of the belt and the belt circumference are kept low, an iterative reduction of the deviation can be achieved through this in a simple way by repeating said steps until a preferably required or predefined tolerance (maximum permissible deviation or amplitude of deviation) is attained.

In some embodiments, the unique reference position is detected for each rotation in order to minimize position error, for example caused by slippage between the belt and pulley. Nevertheless, it would also be conceivable to stipulate several rotations in reference to a uniquely determined reference position, for example if the rotations of a pulley about its axis required per belt rotation is known or if the belt circumference and diameter of the pulley are known.

In some embodiments of the invention, a deviation of the course of the homogeneity of the mass per sector or zone (over the circumference) of the belt from an expected value is determined from the disruptive force, wherein, in correspondence with the deviation of the course, the mass of the belt is increased by adding material or the mass of the belt is reduced by removing material of the belt, in dependence on the position of the belt with reference to the reference position. Accordingly, in these embodiments of the invention, not only the direction but also the amount of the required mass change over the length of the belt circumference is determined.

In embodiments of the invention, an identified deviation of the signal, in particular the force signal, is without exception compensated by removal of belt material. In particular, if there is symmetric geometry and/or preferably identical pulley diameters, a required addition of material in a first region corresponds to a removal of material in at least one second region (complementary to the first region) of the belt circumference.

Of course, it is also possible within the scope of the invention to avoid an addition of material to the belt by considering the maximum of the addition of material (in dependence on the position of the belt with respect to the reference position) as offset. For example, the belt width can be reduced by a corresponding offset, so that a maximum of added material at any position of the belt circumference is represented by the original belt width.

In some embodiments of the invention, a cutting curve is determined from the signal, which gives the extent, in particular the cutting width or cutting depth (perpendicular to the transport direction/belt direction) of the material to be removed, in dependence on the position of the belt with respect to the reference position, and thus uniquely for each position of the belt. Through this a deviation of the mass homogeneity, in particular outside of a predefined tolerance, can be advantageously compensated.

In some embodiments of the invention, material is without exception removed from the edge of the belt, wherein preferably the belt width is reduced over the belt circumference with the help of an offset, as previously explained, or using the property of symmetry, without the addition of material (and maximally has the original width). Instead of machining both edges of the belt, it is also possible to machine the belt only on one side (belt edge).

Instead of a removal of belt material as described above, it is analogously also possible according to the invention to add material, wherein likewise the above described principles, specifically addition of material in at least one second region instead of in a first region complementary thereto (translation in the belt circumference length) or the use of an offset or a zero point translation (vertical, in the direction of the y-axis) of the inverse cutting curve can be used in order to only add material. Of course, mixed forms are also possible in accordance with the invention.

To measure the signal, in particular the weighing or force signal, a plurality of rotations of the belt may be carried out and the weighing signals are averaged, in order to minimize other influences such as motor imbalance or pulley imbalance.

Also, the mass to be changed may be calculated in dependence on the position of the belt with respect to the reference position, thus at a relevant position of the belt, directly from the signal, in particular the weight signal (by means of an inverse convolution or a mathematically iterative method) or iteratively determined indirectly (experimentally).

Of course, mixed forms can also be used in this regard, so that a result of a completed optimization of the belt can be tested by means of a reapplication of the method according to the invention (including changing the calculation to an experimentally iterative determination) and can be further optimized.

To change the mass in dependence on the position of the belt with respect to the reference position, the width of the belt may be reduced, wherein the width of the belt at any position corresponds to the product of the average belt width and the ratio of the mass change to the average mass (per unit length). This approximation is permissible above all when the course of the mass inhomogeneity is essentially constant over the belt width or does not have significant changes toward the belt edge regions.

As explained above, a signal, preferably a weighing signal, is recorded during an idle run by means of a weighing cell or a weighing sensor over at least one rotation (storage device) and evaluated in an evaluation unit. For a unique determination of a reference position, a device according to the invention has a detector, for example a sensor, in particular a reflex light barrier, for detecting the unique reference location, in particular a marking of the belt (for example recorded). Such a marking is quite low in mass and does not change the belt thickness, so that the mass relationships are not (essentially) changed.

Although methods according to the invention can absolutely be carried out continuously in all its embodiments by means of analogous technology (sensors, evaluation, etc.), methods according to the invention, in particular the determination of the cutting curve, may be carried out at discrete intervals, preferably by means of line-by-line scanning along the belt alignment. The scanning rate may be selected so that the scanning is carried out at least twice, preferably more than 10 times, per half the pulley circumference ($R*\pi$), taking into account the belt speed.

From the signal, the device according to the invention determines the course of a deviation of the signal from a set value due to a disruptive force, in dependence on the position of the belt with respect to the reference position.

In correspondence with the identified deviation, the mass of the belt can be increased by adding material or the mass of the belt can be reduced by removing material from the belt (in dependence on the position of the belt with respect to the reference position).

A removal of material can take place manually, for example while displaying the positions of the belt, or automatically, for example by means of an appropriate tool such as a knife, milling machine, ultrasonic knife, laser, punch, etc.

The addition of material to the belt can take place, for example, by applying plastic, resin, rubber, or the like, preferably by means of a dosing syringe. So as not to change the thickness of the belt, recesses in the structured belt surface or fabric of the belt can, for example, be filled (with a liquid that subsequently solidifies).

The term "belt" and "conveyor belt" in the meaning of the invention each indicates an endless belt, and encompasses belts, toothed belts, bands, chains, etc., are included.

Through the method according to the invention and the device for conducting it, mass inhomogeneities that are present in a belt and an imbalance caused by this can advantageously be compensated or reduced, even if the mass inhomogeneity lies outside of a problematic point, namely the splice (belt splice) at which the endless belt is joined.

Moreover, several individual points or a continuous course of a mass inhomogeneity can also be compensated without needing to discard (scrap) a belt that otherwise would lie outside of a required tolerance (with regard to a permissible imbalance or belt impact). Especially for high precision weighing systems, precise weighing results can be guaranteed in a simple way through the use of a belt optimized according to the invention.

These and other advantages and features of the invention will be apparent from the following description of representative embodiments, considered along with the accompanying drawings.

DESCRIPTION OF REPRESENTATIVE EMBODIMENTS

Figure 1:
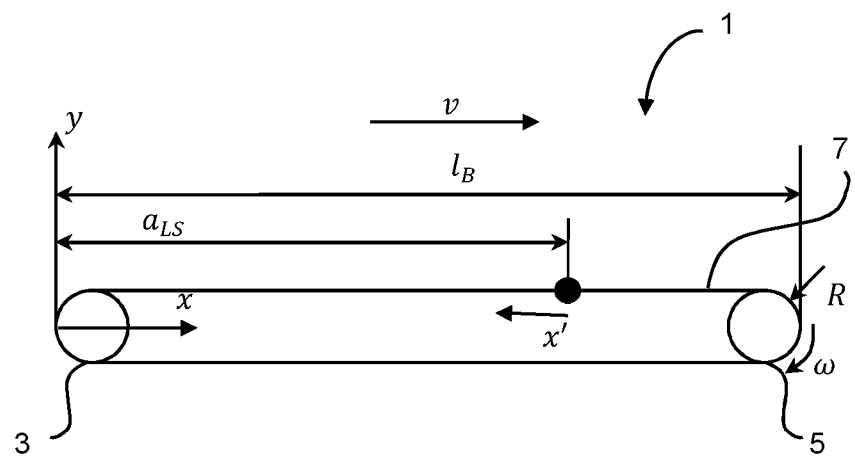
FIG. 1 shows a schematic side view of a weighing belt conveyor.

The weighing belt conveyor 1 shown in FIG. 1 has two outer pulleys 3 (left pulley) and 5 (right pulley), on which an endless belt 7, namely its upper run, makes a reverse turn from the transport direction.

Figure 2:
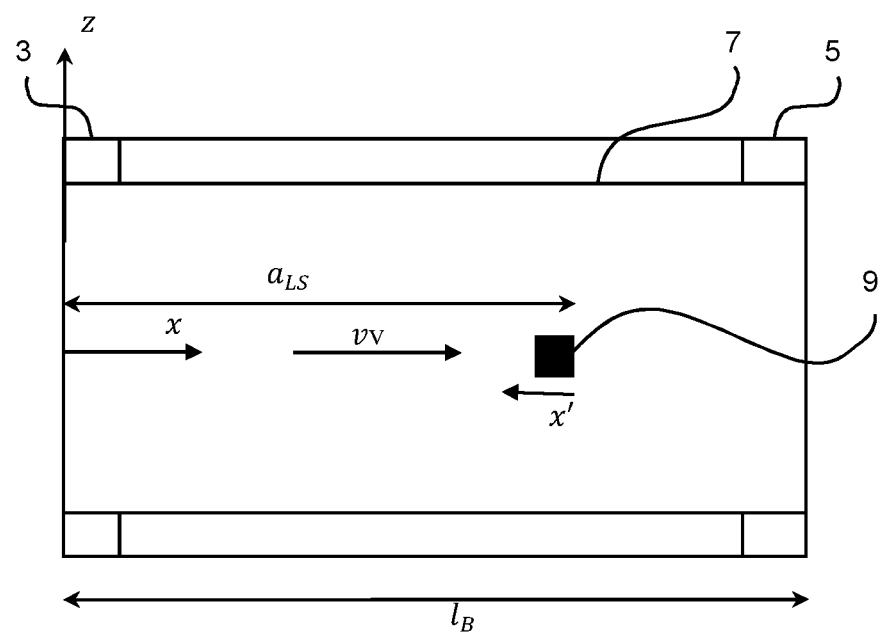
FIG. 2 shows a top view of a weighing belt conveyor as in FIG. 1.

As can be seen from FIG. 2, a marking 9 was made on the endless belt 7 as a reference position, for example recorded or imprinted, which marking advantageously can be removed after conducting the method according to the invention. This marking 9 is detected in idle run operation (without products) by a detector, for example a reflex light barrier, at position $a_{LS}$.

x is in general the coordinate of the conveyor belt in the transport direction. x' is the coordinate of the belt that runs from 0 to $l_G$, thus over the entire belt circumference. The marking 9 for the light barrier is located on the belt at x'=0. At time t=0, the marking 9 is precisely under the light barrier.

For a nominal belt length $l_B$, a circumference of the endless belt (often called belt length) is $$l_G = 2 \cdot (l_B - 2R) + 2\pi \cdot R.$$

If an endless belt 7 is supplied by a manufacturer, its edges, as can be seen from FIG. 2 (the straight upper and lower horizontal lines in the drawing), are made largely straight and even and parallel to each other.

Figure 4:
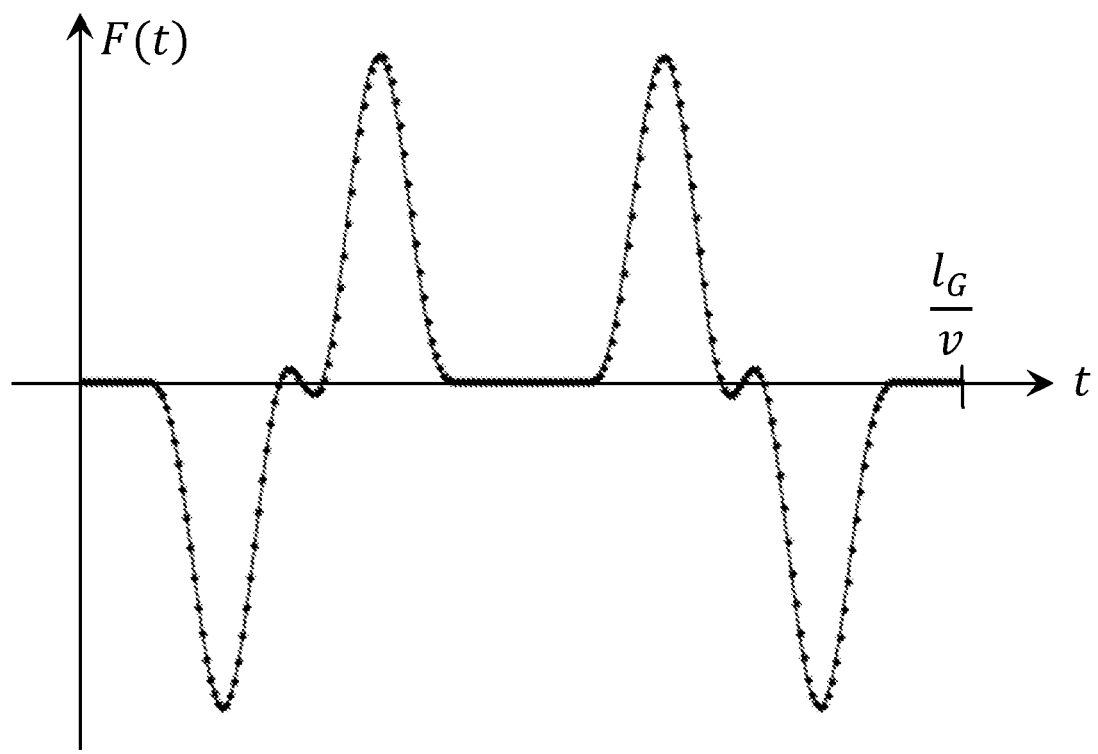
FIG. 4 shows a graph of an identified weight signal of a plurality of idle runs of the weighing belt conveyor as in FIGS. 1 and 2.
Figure 6:
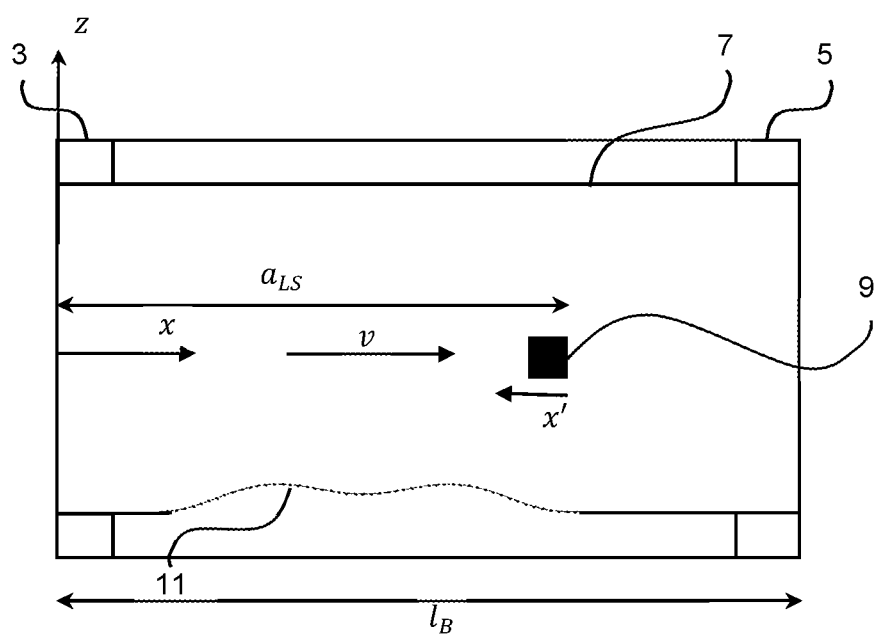
FIG. 6 shows a top view of an endless belt of a weighing belt conveyor machined at an edge in correspondence with the cutting order.

If one subjects such an endless belt 7 (as shown in FIGS. 1, 2, and 6, mounted on pulleys 3 and 5 of a weighing belt conveyor) to a plurality of rotations, for example 100, out-of-phase synchronous disruptions (motor imbalance, pulley imbalance, etc.) (caused by impact between pulley and belt) are transmitted from a detected force signal, in particular a weight signal F(t), as shown in FIG. 4.

Below is explained a mathematical method that can preferably be used to calculate a cutting curve, in order to appropriately remove material and through this to compensate the detected imbalance.

For t=0, a point mass $m_0$ is located at the light barrier position. If the endless belt moves at a belt speed v and the two pulleys have the same radius R, the following force signal results.

$$F_0(t) = \begin{cases} -m_0 \cdot R \cdot \omega^2 \cdot \cos\left(\omega \cdot \left(t - \frac{l_B - a_{LS} - R}{v}\right)\right) & \text{for } \frac{l_B - a_{LS} - R}{v} \le t \le \frac{l_B - a_{LS} - R + \pi R}{v} \\ m_0 R \cdot \omega^2 \cdot \cos\left(\omega\left(t - \frac{2l_B - a_{LS} - 3R - \pi R}{v}\right)\right) & \text{for } \frac{2l_B - a_{LS} - 3R + \pi R}{v} \le t \le \frac{2l_B - a_{LS} - 3R + 2\pi R}{v} \\ 0 & \text{otherwise} \end{cases}$$

$$\omega = \frac{v}{R}$$

is the angular velocity of the pulley.

If there are several pulleys and/or different pulley radii, as in the case of a vertical system, the formula can be appropriately adjusted.

The force can now still be normalized to the mass, so that the acceleration that a point mass experiences in one rotation is.

$$a_0(t) = \frac{F_0(t)}{m_0}$$

Figure 3:
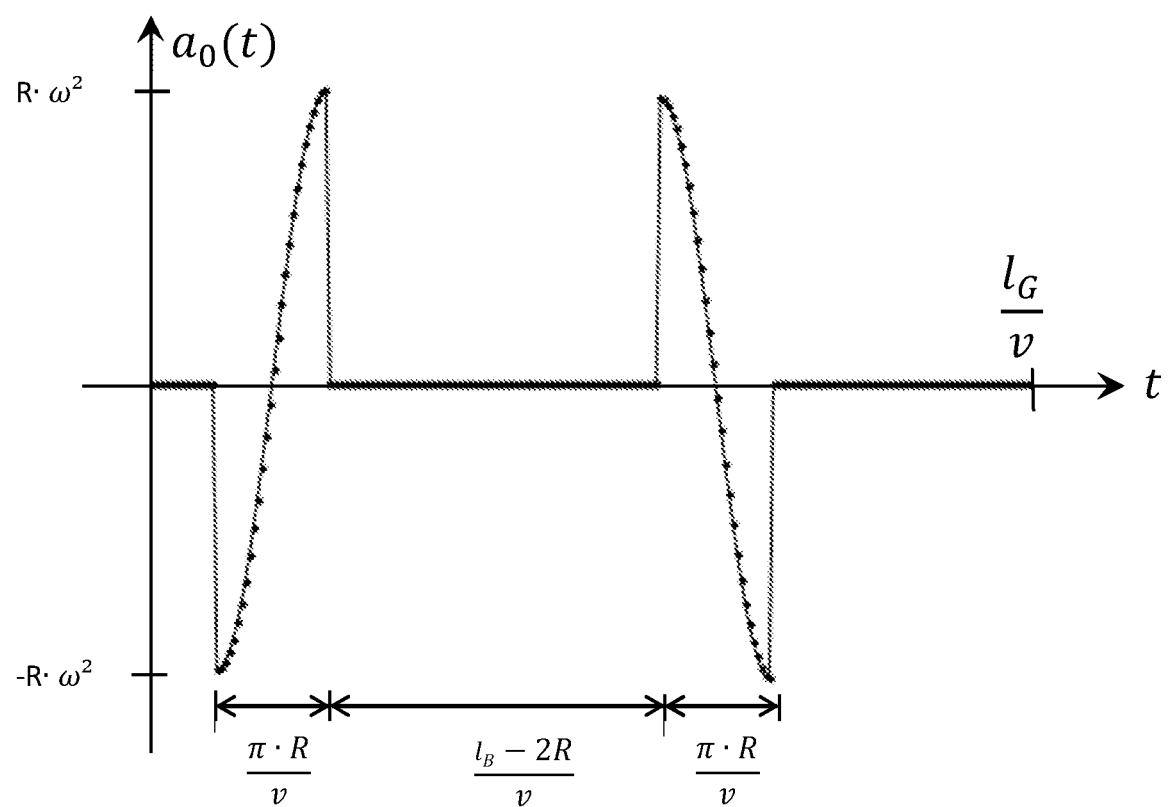
FIG. 3 shows a graph of the acceleration of a mass point.

This function is then only dependent on geometry and speed (see FIG. 3).

If the signal $F_0(t)$ is periodically continued, it has the following interesting symmetry property:

$$F_0\left(t - \frac{l_G}{2v}\right) = F_0(-t)$$

For a point mass $m_1$ at the belt position $x'_1$, the force signal has the (time) function.

$$F_1(t) = \frac{m_1}{m_0} F_0\left(t - \frac{x'_1}{v}\right)$$

For many masses $m_i$ at the belt positions $x'_i$, then the following sum signal results $$F = m_0 a_0(t) + m_1 a_0\left(t - \frac{x'_1}{v}\right) + m_2 a_0\left(t - \frac{x'_2}{v}\right) + \ldots + m_{N-1} a_0\left(t - \frac{x'_{N-1}}{v}\right) = \sum_{n=0}^{N-1} m_n a_0\left(t - \frac{x'_n}{v}\right)$$

In practical terms, however, a measurement is not mostly present as a continuous function of time, but rather, as shown in FIG. 4, it exists as a timewise scanned function of the force F(n) with n as timewise scanning. Likewise, $a_0(n)$ derives from $a_0(t)$. The scanning interval will be, for example, $T_a=1$ ms. The belt moves further around the path $x_a=v \cdot T_a$ in time $T_a$.

The belt can be imagined as divided in the small strips. The strips have the belt width $b_G$ as the long side and the strip length $x_a$ as the short side. These strips each have the mass m(k) with k being the numerical index of the strip. The total mass of a belt consisting of N strips is:

$$m_G = \sum_{k=0}^{N-1} m(k)$$

Mathematically, the following convolution sum results from equation F(t) in the discrete time case.

$$F(n) = \sum_{k=0}^{N-1} m(k) \cdot a_0(n-k)$$

The unknown mass per sector or zone m(k) is obtained by inverse convolution, which can usually take place via inverse discrete Fourier transformation.

F(n) must have the same symmetry property as $a_0(n)$ if the weight signal arises in a belt run only because of an uneven mass distribution of the belt and the pulleys 3 and 5 have the same radius R.

$$F\left(n - \frac{N}{2}\right) = -F(n)$$

This applies in this form for straight N, which for the sake of simplicity can initially be assumed. Otherwise, an interpolation is necessary.

In any case, it is useful to check the symmetry. For this, the two halves of a period of F(n) can be averaged together.

$$\overline{F}(n) = \frac{1}{2} \cdot \left(F(n) - F\left(n - \frac{N}{2}\right)\right)$$

If $F(n) \approx \overline{F}(n)$, this can be used for further calculations. In the simplest case this can be checked by inspection after superpositioning the two time functions. If the condition is not met, the basic disruption in the weight signal has causes other than the mass distribution of the belt.

To determine the cutting width or cutting depth perpendicular to the belt direction, one can use the following proportionality, which is a sufficient approximation:

$$\frac{m(k)}{m_G/N} = \frac{b_s(k)}{b_G}$$

$$\boxed{b_s(k) = \frac{b_G \cdot N}{m_G} \cdot m(k)}$$

where $b_s(k)$=the width of the strip k reduced by one piece.

This approximation is mainly permissible when the course of the mass inhomogeneity is essentially constant over the belt width or does not exhibit any significant changes toward the belt edge regions.

When a preferably high precision weighing cell (not shown in the drawing) is used, the weighing surface of which is formed by the belt conveyor shown schematically in FIGS. 1, 2, and 6, including endless belt 7 and pulleys 3 and 5, an averaged weight signal F(t), as is schematically shown in exaggerated form in FIG. 4, arises, for example (if there is a mass inhomogeneity) by means of a scanning interval $T_a$ of, for example, 1 ms in an idle run.

Although there is no transported and weighed material on the weighing belt 7 (so-called idle run), clearly one (or more) (inversely) repeating swings can be seen in the weight signal F(t). If the amplitude of this swing lies outside a required tolerance (not shown in the drawing) (desired measurement precision of the weighting device), this disruption must be reduced or even eliminated.

Since the weight signal F(t) was preferably measured over a number of runs, and since other disruptive parameters no longer arise because of the phase shift in this signal (as a consequence of averaging), one can conclude from the detected swings that there is imbalance in the belt.

An imbalance in the belt is, however, as explained above, based in an inhomogeneity of the belt or uneven mass distribution of the mass of the belt. This uneven mass distribution leads, at a pulley, when changing from the linear (mostly horizontal) position, to an acceleration acting on it ($R \cdot \omega^2$), where, in an ideal interpretation, a mass point experiences an acceleration $a_0(t)$ in the direction of the detected force, in particular the weight force, as shown in FIG. 3.

Correspondingly, the centripetal force/centrifugal force produced by the acceleration acts with its directed component on the detected force signal $F_0(t)$, in particular the weight signal.

The force signal F(t), in particular the weight signal, which is shown in FIG. 4 and is measured, for example, by means of a weighing sensor, receives an inverse deflection that repeats in a complete rotation of the belt (after a traversed half belt circumferential length $l_G/2$), which is caused by the travel of a mass inhomogeneity first to the left pulley 3 and then to the right pulley 5, which in this case have the same radius R.

In the case of symmetric geometry, in particular identical pulley radii R, as shown in FIG. 1, it is therefore sufficient to consider half of the belt circumference $l_G$, since for the detected weight signal F(t) it is the same if the mass is too great on one side or too little on the other.

Figure 5:
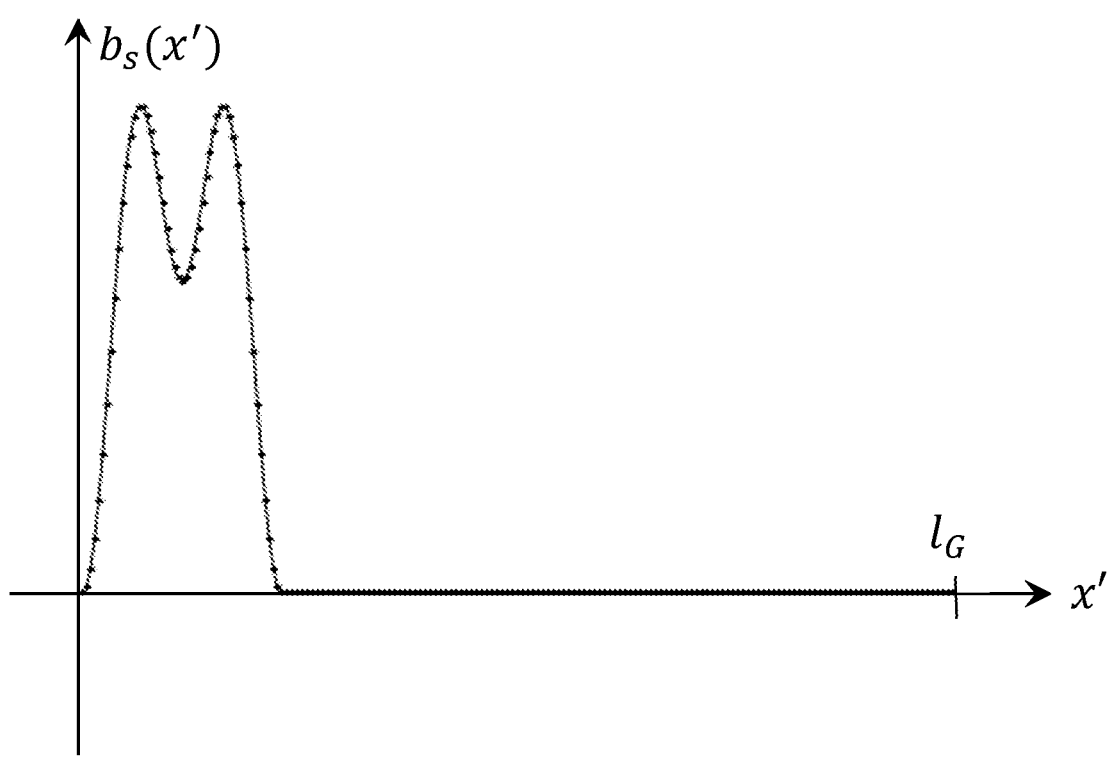
FIG. 5 shows a graph of a cutting curve (cutting order or cutting width) determined from the weight signal as in FIG. 3.

From this weight signal F(t), various methods can be used to determine a cutting curve $b_S(x')$, which is shown in FIG. 5, according to which at least one belt edge (preferably only one side) is to be machined (cut width per position or cut width per scanning interval). The cut width $b_s$ is the width of a strip of the length $x_a$ (looking along the transport direction) that will be cut off.

For a scanning interval of 1 ms and a transport speed v=3 m/s, for example, a strip length (looking in the transport direction) of 3 mm or a scanning every 3 mm along the belt length results. For a pulley diameter of, for example, 17.2 mm thus at least 9 scannings result for a half pulley circumference of 27.0, so that this region, which is relevant for a disruption of the weight signal, is resolved highly enough (at least 2 scannings) to measure the cutting width for this strip k.

For example, a cutting curve $b_S(x')$, as shown in FIG. 5, can be determined from $b_s(k)$, with $x'=k \cdot x_a$.

However, as explained for the example above, measurement of the belt mass per sampled unit of length m(k) with otherwise known parameters such as the belt with $b_G$, belt mass or total mass of the belt $m_G$, etc., is necessary for this.

Moreover, in such special cases a belt can be balanced, instead of a measured necessary addition of material to the belt (in the first half of the belt circumference) and equivalent removal of belt material (cutting of the belt edge) in the second belt half (shifted by half the belt circumference $$\frac{l_G}{2}\bigg).$$

The belt 7 shown in FIG. 6 has a lower edge 11, which is shown in the drawing and which was cut in correspondence with the cutting curve $b_S(x')$. Thus the corresponding curve of the width $b_S(x')$ to be reduced (in direction z) is depicted in this very clear representation.

Instead of a horizontal arrangement of a weighing belt conveyor as shown in FIG. 1, it is also conceivable to arrange the device perpendicularly to optimize the running properties of a rotating belt of a weighing belt conveyor—one tilted about an axis perpendicular to the plane of the drawing. In this case, the above embodiments with regard to force signal disruptive force, and cutting curve, etc., result in an analogous way for one skilled in the art.

In such an embodiment, belt movements and belt oscillations in the upper run and lower run perpendicular to the plane of the belt advantageously do not have an adverse effect on the result (F(t)).

Possibilities for cutting the belt include, for example, lasers, knives, ultrasonic knives, as well as a milling machine or punch.

Of course, it is also conceivable to balance the belt with a hole pattern, for example cut or punched at the edge, instead of cutting material at the end of the belt.

The embodiments explained above with regard to removal of belt material to balance a detected imbalance can analogously also be applied to the addition of material to the belt.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, vertical, and the like with reference to a given feature are made with reference to the orientation of the structures shown in the drawings and are not intended to exclude other orientations of the structures.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE CHARACTER LIST

1 Weighing belt conveyor
3 Left pulley
5 Right pulley
7 Endless belt
9 Marking
11 Cut edge of belt corresponding to the cutting curve
x=0 Reference position at t=0
t=0 Beginning of a cycle at x=0
$l_B$ Nominal belt length
$l_G$ Belt circumference
R Pulley radius
F(t) Weight signal
$m_0$ Point mass
ω Angular velocity of pulley (v/R)
$m_G$ Total mass of belt (belt mass)
T Rotation period of belt
$T_a$ Scanning interval
v Belt speed
$x_a$ Short side of strip (strip length)
m(k) Mass of strip k
N Number of strips
$b_S(k)$ Width of the strip k reduced by a piece
$b_G$ Belt width

The invention claimed is:
1. A method including:
(a) for a conveyor belt of a conveyor belt system, defining a reference position along the length of the conveyor belt;
(b) during at least one rotation of the conveyor belt in a rotation direction, determining a force signal in dependence on the movement of the reference position;
(c) determining a course of deviation of the force signal from a set force value as a consequence of a disruptive force from the rotation of the conveyor belt; and
(d) changing the mass of the conveyor belt at locations along the length of the conveyor belt, the change in the mass of the conveyor belt at each location being at least in correspondence with a direction of the determined deviation of the force signal at that location.

2. The method of claim 1 wherein the change in the mass of the conveyor belt at each location is also in correspondence with a magnitude of the determined deviation of the force signal at that location.

3. The method of claim 1 wherein the deviation of the force signal is compensated, without exception, by removal of belt material at a removal region of the conveyor belt which is complementary to an addition region of the conveyor belt.

4. The method of claim 1 wherein the deviation of the force signal is compensated, without exception, by removal of belt material, while additionally taking into account a maximum of an addition of material as offset.

5. The method of claim 1 wherein the mass of the conveyor belt is changed by removing material from the conveyor belt and further including determining a cutting curve from the force signal, the cutting curve defining a mass of conveyor belt material to be removed in dependence on the position on the conveyor belt with respect to the reference position.

6. The method of claim 1 wherein the mass of the conveyor belt is changed by removing material from the conveyor belt and wherein material is removed from the conveyor belt at least at one lateral edge of the conveyor belt.

7. The method of claim 1 wherein the mass of the conveyor belt is changed by removing material from the conveyor belt and wherein material is removed from the conveyor belt only from a lateral edge of the conveyor belt.

8. The method of claim 1 wherein:
   (a) determining the force signal in dependence on the movement of the reference position includes causing the conveyor belt to rotate through two or more individual rotations and for each such individual rotation determining a respective single-pass force signal in dependence on the movement of the reference position; and
   (b) the force signal corresponding to a given point along the length of the conveyor belt comprises an average of the respective single-pass force signals determined for that respective point along the length of the conveyor belt.

9. The method of claim 1 wherein the change in the mass of the conveyor belt at a given location along the length of the conveyor belt is computed directly from the force signal or is iteratively determined.

10. The method of claim 9 wherein changing the mass of the conveyor belt along the length of the conveyor belt includes reducing the width of the conveyor belt at one or more locations along the length of the conveyor belt such that the width of the conveyor belt at any such location corresponds to the product of an average belt width and a ratio of the mass change at that location and an average mass of the of the conveyor belt per unit length.

11. The method of claim 1 wherein the reference position along the length of the conveyor belt is defined by one of (i) a detectable marking at a marking location along the length of the conveyor belt or (ii) a unique position of a pulley over which the conveyor belt passes in the rotation of the conveyor belt.

12. A weighing belt for use in a weighing belt conveyor, the weighing belt comprising the conveyor belt optimized in accordance with the method of claim 11.

13. A weighing system including the weighing belt of claim 12.

14. A device including:
   (a) a detector configured to detect a reference position along the length of a conveyor belt of a conveyor belt system;
   (b) a sensor configured to output a force signal over a course of at least one rotation of the conveyor belt by the conveyor belt system; and
   (c) an evaluation unit configured to (i) receive the force signal and determine a course of a deviation of the force signal from a set force value in dependence on the position of the conveyor belt relative to the reference position, and to (ii) determine at least a direction of the deviation in dependence on the position of the conveyor belt relative to the reference position to facilitate changing the mass of the conveyor belt at locations along the length of the conveyor belt at least in correspondence with the direction of the determined deviation of the force signal at the respective location.

15. The device of claim 14 wherein the evaluation unit is configured so that, from the force signal, a deviation of the course of the homogeneity of the mass coating of the conveyor belt from a set value is determined to facilitate, in correspondence with the deviation of the course of the homogeneity of the mass coating, either (i) increasing the mass of the conveyor belt by adding material to the conveyor belt in dependence of the position of the conveyor belt with respect to the reference position or (ii) reducing the mass of the conveyor belt by removing material of the conveyor belt in dependence on the position of the conveyor belt with respect to the reference position.

16. The device of claim 14 further including a tool for automatic removal of conveyor belt material from the conveyor belt, or for automatic addition of material to the conveyor belt, or for both automatic removal of conveyor belt material from the conveyor belt and automatic addition of material to the conveyor belt.

* * * * *